(12) United States Patent
Matsubara et al.

(10) Patent No.: US 8,601,501 B2
(45) Date of Patent: Dec. 3, 2013

(54) OPTICAL DISC DRIVING DEVICE AND WIRING STRUCTURE

(75) Inventors: Ryo Matsubara, Osaka (JP); Hideto Soga, Osaka (JP); Tomio Yamamoto, Hyogo (JP); Yasuyuki Torii, Kyoto (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/617,500

(22) Filed: Sep. 14, 2012

(65) Prior Publication Data

US 2013/0014135 A1    Jan. 10, 2013

Related U.S. Application Data

(63) Continuation of application No. PCT/JP2012/000184, filed on Jan. 13, 2012.

(30) Foreign Application Priority Data

Feb. 17, 2011 (JP) .................................. 2011-031597

(51) Int. Cl.
*G11B 7/08* (2006.01)

(52) U.S. Cl.
USPC ......... 720/659; 720/600; 720/653; 369/75.11

(58) Field of Classification Search
USPC ......... 369/71, 72, 75.2, 75.1, 77.1, 77.2, 100, 369/75.11, 44.16, 30.41, 30.52, 30.46, 369/30.73, 30.58, 30.94; 720/641, 648, 720/622, 650, 659, 600; 360/99.15
See application file for complete search history.

(56) References Cited

U.S. PATENT DOCUMENTS

| | | | |
|---|---|---|---|
| 5,050,154 A | 9/1991 | Shimozawa et al. | |
| 5,231,623 A | 7/1993 | Kanno et al. | |
| 6,205,027 B1 | 3/2001 | Nakajima | |
| 6,388,971 B2 | 5/2002 | Fujisawa | |
| 7,733,600 B2 * | 6/2010 | Endo et al. ................. | 360/99.15 |

(Continued)

FOREIGN PATENT DOCUMENTS

| | | |
|---|---|---|
| JP | 5-234349 | 9/1993 |
| JP | 6-215556 | 8/1994 |

(Continued)

OTHER PUBLICATIONS

International Search Report issued Feb. 7, 2012 in International (PCT) Application No. PCT/JP2012/000184.

(Continued)

*Primary Examiner* — Ali Neyzari
(74) *Attorney, Agent, or Firm* — Wenderoth, Lind & Ponack, L.L.P.

(57) ABSTRACT

An optical disc driving device has a metallic exterior casing and an internal unit to be housed in the exterior casing. The internal unit further includes an optical pickup unit for performing recording or reproduction of information signals on an optical disc, and a printed wiring substrate on which a connector electrically connected to the optical pickup unit and serving for transmission and reception of electrical signals from and to external electronic equipment via an external-connection cable is mounted. The exterior casing has an opening for allowing the connector project outside, and the connector is connected to the external-connection cable in a direction that orthogonally crosses with a projecting direction of the connector from the opening, and the external-connection cable extends from the connector along a surface of the exterior casing.

5 Claims, 4 Drawing Sheets

(56) References Cited

U.S. PATENT DOCUMENTS

| | | | |
|---|---|---|---|
| 8,151,286 B2* | 4/2012 | Morisono | 720/652 |
| 2007/0076320 A1 | 4/2007 | Endo et al. | |
| 2009/0235292 A1 | 9/2009 | Morisono | |
| 2012/0213050 A1* | 8/2012 | Matsubara et al. | 369/100 |
| 2013/0014133 A1* | 1/2013 | Matsubara et al. | 720/600 |
| 2013/0014135 A1 | 1/2013 | Matsubara et al. | |

FOREIGN PATENT DOCUMENTS

| | | |
|---|---|---|
| JP | 2000-11622 | 1/2000 |
| JP | 2001-251082 | 9/2001 |
| JP | 2001-291985 | 10/2001 |
| JP | 2009-217892 | 9/2009 |
| JP | 2010-92558 | 4/2010 |

OTHER PUBLICATIONS

International Search Report issued Feb. 7, 2012 in International (PCT) Application No. PCT/JP2012/000183.

Office Action issued Dec. 6, 2012 in related U.S. Appl. No. 13/398,175.

Office Action issued Apr. 26, 2013 in corresponding U.S. Appl. No. 13/617,422.

USPTO Office Action mailed Jul. 3, 2013 in corresponding U.S. Appl. No. 13/398,175.

* cited by examiner

TRACKING DIRECTION

LOADING DIRECTION

DISC INSERTION OPENING 1a SIDE

DISC INSERTION OPENING 1a SIDE

OPTICAL DISC DRIVING DEVICE AND WIRING STRUCTURE

CROSS-REFERENCE TO RELATED APPLICATIONS

This is a continuation application of International Application No. PCT/JP2012/000184, with an international filing date of Jan. 13, 2012, which claims priority of Japanese Patent Application NO.: 2011-031597 filed on Feb. 17, 2011, the content of which is incorporated herein by reference.

BACKGROUND

1. Technical Field

The technical field relates to an optical disc driving device and wiring structure for performing recording or reproduction on an optical disc.

2. Description of Related Art

Conventionally, optical disc drive devices for performing recording or reproduction of information on optical discs such as DVDs and Blu-ray Discs (BDs) are mounted on electronic equipment such as game equipment, recorders and players.

This type of optical disc drive device has an internal unit including an optical pickup unit for performing optical recording or reproduction on an optical disc, a rotation drive device for driving rotation of an optical disc, a moving mechanism for moving the optical pickup unit in radial directions of an optical disc, and the like. Also, the optical disc drive device has an electroconductive, metallic exterior casing for housing the internal unit.

In information recording/reproducing devices such as hard disks, as shown in Japanese Patent Application Publication No. 2001-291985A, conventionally, an internal unit is housed in a metallic exterior casing for purposes of dust prevention for the internal unit and shielding outward radiation noise. Also in optical disc drive devices, the internal unit is housed in a metallic exterior casing from the same reasons.

In such devices as optical disc driving devices shown above in which the internal unit is housed in an exterior casing, there is a need for taking measures against noise radiated from wiring lines provided for transmission and reception of electrical signals between the internal unit and external electronic equipment.

SUMMARY OF THE INVENTION

Accordingly, an object of the present invention is to reduce noise radiated from wiring lines provided for transmission and reception of electrical signals between the internal unit housed in the exterior casing and external electronic equipment.

In one general aspect, the present disclosure describes an optical disc driving device having a metallic exterior casing and an internal unit to be housed in the exterior casing, the internal unit further including an optical pickup unit for performing recording or reproduction of information signals on an optical disc, and a printed wiring substrate on which a connector electrically connected to the optical pickup unit and serving for transmission and reception of electrical signals from and to external electronic equipment via an external-connection cable is mounted. The exterior casing has an opening for allowing the connector to be projected outside, the connector is connected to the external-connection cable in a direction that crosses with a projecting direction of the connector from the opening, and the external-connection cable extends from the connector along a surface of the exterior casing.

According to the present disclosure, noise radiated from wiring lines for fulfilling transmission and reception of electrical signals between the internal unit housed in the exterior casing and external electronic equipment can be reduced.

DETAILED DESCRIPTION

Hereinbelow, an embodiment of the present disclosure will be described with reference to the accompanying drawings.

Figure 1:
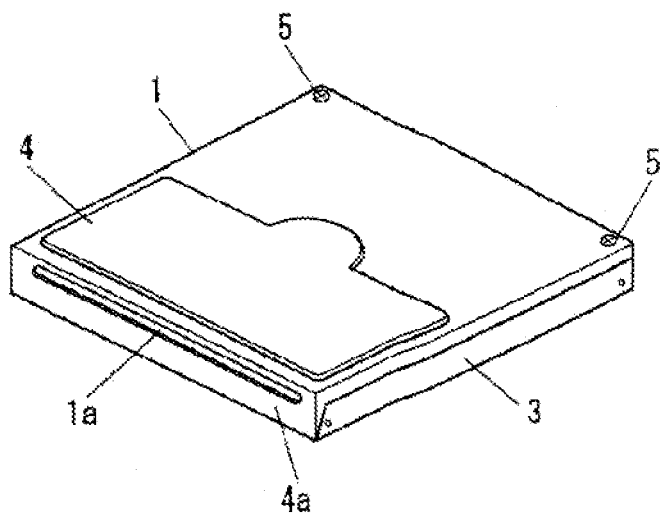
FIG. 1 is a perspective view showing an appearance of an optical disc drive device according to an embodiment.
Figure 2:
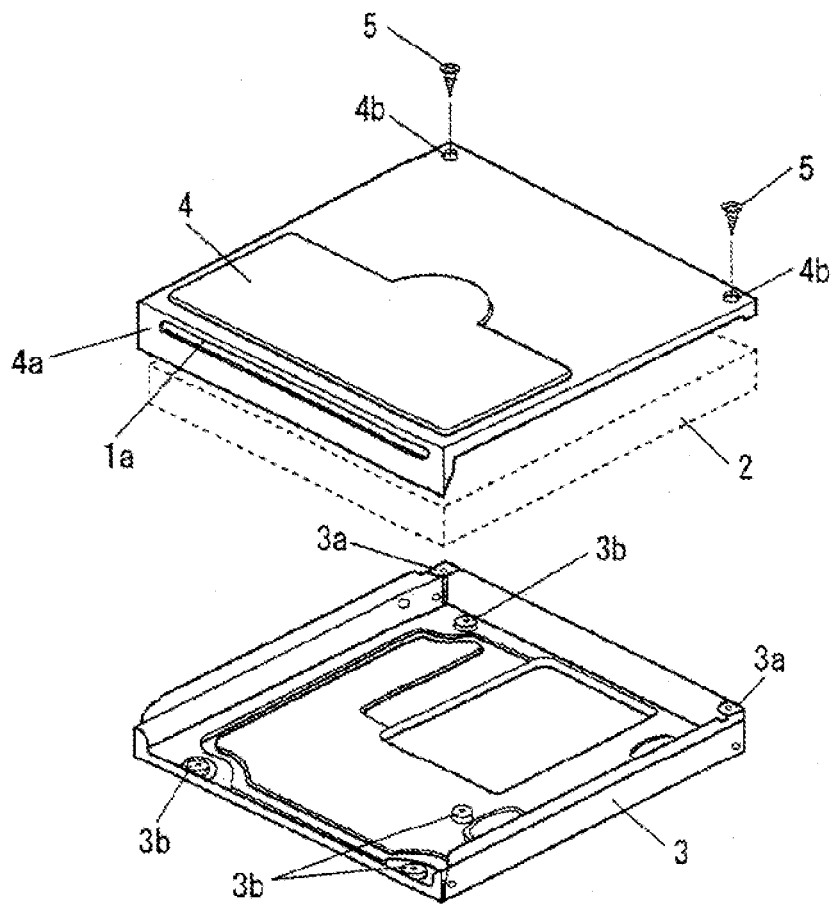
FIG. 2 is an exploded perspective view showing a state in which the exterior casing is exploded.

FIG. 1 is a perspective view showing an appearance of an optical disc drive device according to an embodiment of the disclosure. FIG. 2 is an exploded perspective view showing a state in which the exterior casing is exploded. As shown in FIGS. 1 and 2, the optical disc drive device is made up with an internal unit 2 housed in an electroconductive, metallic exterior casing 1 having a disc insertion opening 1a. The exterior casing 1 also serves a role as a shield for reducing outward release of radiation noise generated from the internal unit 2.

The exterior casing 1 is composed of a quadrilateral box-like first casing 3, and a quadrilateral lid-like second casing 4 which is put on the first casing 3 so as to cover an upper opening portion of the first casing 3 and which has a front portion 4a with the disc insertion opening 1a formed therein. The internal unit 2 can be housed in the exterior casing 1 by first doing temporary fixing, i.e. hanging of the front portion 4a of the second casing 4 to a front portion of the first casing 3, then putting a rear portion of the second casing 4 on a rear portion of the first casing 3, and subsequently screwing the rear portion of the second casing 4 to the rear portion of the first casing 3 with screws 5.

As shown in FIG. 2, fixing portions 3a each having a screw hole to which a screw 5 is tightened are provided in the upper opening portion of the first casing 3. At portions of the second casing 4 corresponding to those fixing portions 3a, through holes 4b through which the screws 5 are to be inserted are provided, respectively. The screws 5 are inserted through the holes 4b of the second casing 4, respectively, so as to be tightened to the screw holes of the fixing portions 3a of the first casing 3.

Further, as shown in FIG. 2, a plurality of fitting portions 3b each having a screw hole to which a screw is tightened to fix the internal unit 2 into the first casing 3 are formed in a bottom face of the first casing 3.

The exterior casing 1 can be made by molding a sherardized steel sheet having a thickness of 0.4 mm to 0.5 mm. In particular, the first casing 3 can be made by using, for example, thin-plate sheet metal or the like of a copper sheet, tin sheet, stainless sheet or the like having a thickness of 0.2 mm to 0.3 mm. In addition, when rust-proofing property is considered preferentially important, tin plates or stainless sheets are preferably used. In addition, with cost regarded as another important factor, tin plates are preferably used.

Figure 3:
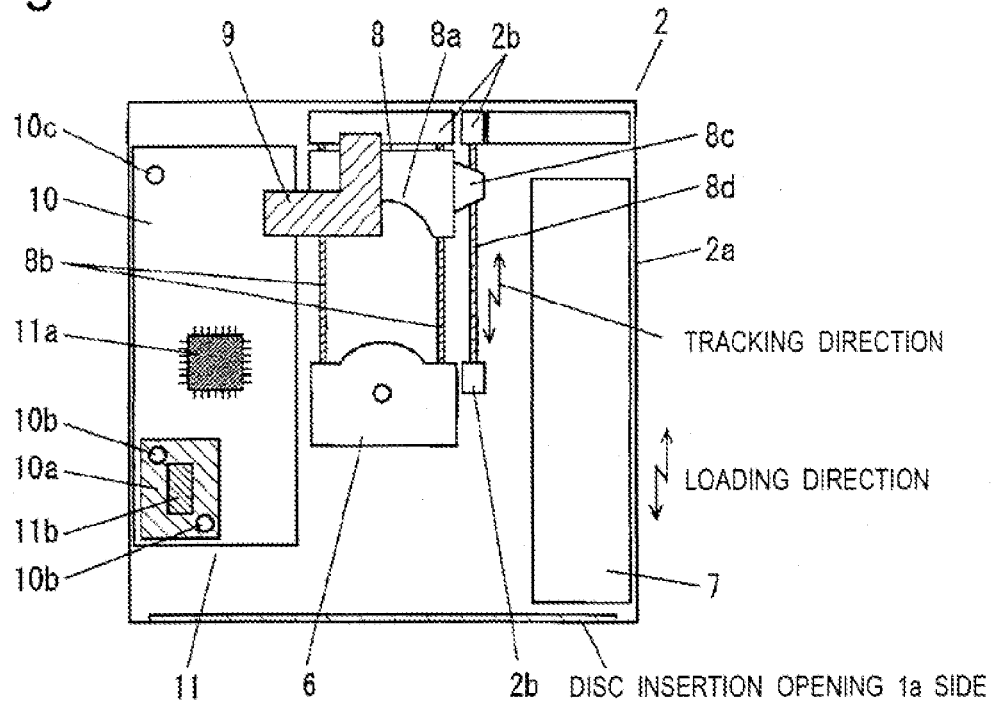
FIG. 3 is a schematic plan view showing a schematic structure of an internal unit of the optical disc drive device.

FIG. 3 is a schematic plan view showing a schematic structure of the internal unit of the optical disc drive device. As shown in FIG. 3, the internal unit 2 has, in a metallic unit housing 2a, a spindle motor 6 for holding a center of an optical disc and rotating the disc at high speed, a disc insertion mechanism 7 for guiding an optical disc inserted through the disc insertion opening 1a to the spindle motor 6, an optical pickup unit 8 for performing recording/reproduction of information signals on an optical disc, and a control circuit block 11 having a printed wiring substrate 10 electrically connected via a flexible wiring substrate 9 to electronic components of the optical pickup unit 8.

The disc insertion mechanism 7, under control of the control circuit block 11, introduces an optical disc inserted through the disc insertion opening 1a into the internal unit 2 and guides the optical disc to the spindle motor 6 so that the center of the optical disc is aligned with a rotating shaft of the spindle motor 6.

The optical pickup unit 8 has an optical pickup part 8a on which a semiconductor laser device and an optical lens for applying light of a specified wavelength to an optical disc rotated by the spindle motor 6 are mounted, guide shafts 8b for holding the optical pickup part 8a so that the optical pickup part 8a can be moved linearly in radial directions of the optical disc, and a tracking mechanism for moving the optical pickup part 8a in radial directions of the optical disc. The tracking mechanism has a gear part 8c provided in the optical pickup part 8a, and a rotating shaft 8d meshing with the gear part 8c. As the rotating shaft 8d is rotated under control by the control circuit block 11, the optical pickup part 8a is moved in a radial direction of the optical disc via the gear part 8c.

The guide shafts 8b of the optical pickup unit 8 as well as the rotating shaft 8d of the tracking mechanism are held by holding parts 2b provided in the unit housing 2a.

The control circuit block 11 is made up so that a microcomputer or other semiconductor integrated circuit element 11a and its peripheral circuits are mounted on the printed wiring substrate 10 while an interfacing connector 11b for transmission and reception of electrical signals from and to external electronic equipment (not shown) is mounted thereon. The semiconductor integrated circuit element 11a of the control circuit block 11 controls the spindle motor 6, the disc insertion mechanism 7, and the optical pickup unit 8, and also processes signals for information writing onto an optical disc via the optical pickup unit 8 or signals read from an optical disc. Signals are also delivered and received between the control circuit block 11 and external electronic equipment via the interfacing connector 11b.

Further, on the printed wiring substrate 10 of the control circuit block 11, a ground pattern 10a is formed so as to surround the connector 11b mounted on the printed wiring substrate 10. Whereas the printed wiring substrate 10 is made up by alternately stacking electrically conductive layers of copper foil or the like and insulating layers of epoxy resin or the like, the ground pattern 10a can be formed by cutting out part of the insulating layers of the printed wiring substrate 10 so that the conductive layers are exposed.

The ground pattern 10a, as will be described later, has through holes 10b formed therein for insertion of screws serving for electrical connection of the ground pattern 10a and the first casing 3 of the exterior casing 1 to each other as well as for mechanical fitting of the printed wiring substrate 10 to the first casing 3. Further, another ground pattern (not shown) is provided at an end portion of the printed wiring substrate 10. Also provided are through holes 10c for electrical connection of the exterior casing 1 and the unit housing 2a to each other via the another ground pattern as well as for mechanical fitting of the printed wiring substrate 10 to the unit housing 2a (see FIG. 3).

Figure 4:
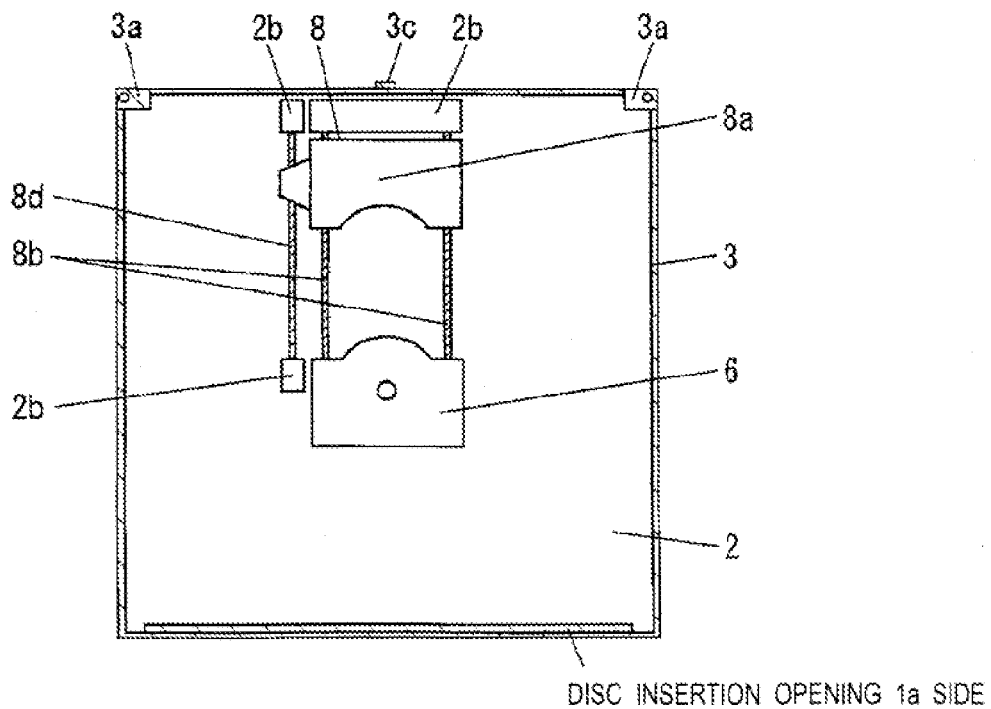
FIG. 4 is a plan view showing a state in which the internal unit is housed in a first casing.

FIG. 4 is a plan view showing a state in which the internal unit is housed in the first casing. As shown in FIG. 4, the internal unit 2 is housed in the first casing 3 so that the printed wiring substrate 10 of the control circuit block 11 is positioned on the bottom side, and the internal unit 2 is fitted to the fitting portions 3b in the bottom portion of the first casing 3 with screws (not shown). It is noted that as shown in FIG. 4, the internal unit 2 is fitted to the first casing 3 in a state reversed from the state shown in FIG. 3.

Figure 5:
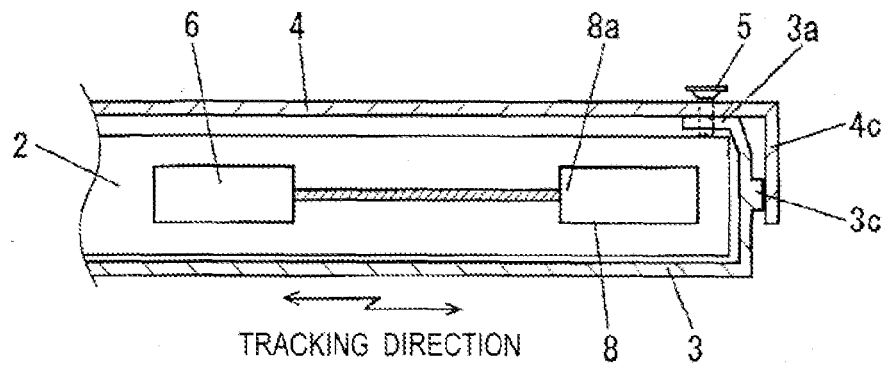
FIG. 5 is a sectional view showing part of a completed structure in which with the first casing and a second casing set up, the internal unit is housed in the exterior casing.

FIG. 5 is a sectional view showing part of a completed structure in which with the first casing and the second casing set up, the internal unit is housed in the exterior casing.

As shown in FIGS. 4 and 5, a protrusion 3c is provided at a portion of the first casing 3 to which the optical pickup part 8a moved radially outward of the optical disc makes a closest approach, i.e., at a portion of a rear-side side wall fixed with the two screws 5. In this embodiment, the protrusion 3c is provided, specifically, at a central portion of the side wall of the first casing 3 to which the optical pickup part 8a makes a closest approach and which corresponds to an intermediate position of the two screws 5.

This protrusion 3c, which protrudes outward, comes into contact with a side wall 4c of the second casing 4 when the second casing 4 is fitted to the first casing 3. As a result, the protrusion 3c and the second casing 4 are electrically connected to each other. The protrusion 3c is formed by extruding part of the side wall of the first casing 3. Alternatively, the protrusion 3c may be formed by forming two slits parallel to part of the side wall of the first casing 3 and further bending a portion between the two slits. Furthermore, the protrusion 3c may also be formed by fitting another metallic member to the side wall of the first casing 3 by welding or brazing or the like. In addition, although FIGS. 4 and 5 show one example in which one protrusion 3c is formed, a plurality of protrusions 3c may also be formed in the side wall to which the optical pickup part 8a makes a closest approach.

The reasons why such a protrusion 3c is provided are described below. Such an optical disc drive device as shown in FIGS. 1 to 5, in which the internal unit 2 is housed in the exterior casing 1 composed of the first casing 3 and the second casing 4, has been under a demand for downsizing as electronic equipment containing the optical disc drive device gets downsized more and more. For downsizing of the optical disc drive device, measures are implemented such as reduction of clearances between the internal unit 2 and the exterior casing 1, thinning of the exterior casing 1, simplification of the assembling structure of the exterior casing 1, and the like.

However, with the optical disc drive device downsized, it would occur, in some cases, that a central portion of the side wall of the first casing 3 to which the optical pickup part 8a, when moved to an outermost peripheral portion of an optical disc, makes a closest approach, and/or an opposing central portion of the side wall 4c of the second casing 4 is flexed. That is, it might occur heretofore that an unfixed portion corresponding to an intermediate position between the two screws 5 is flexed. Moreover, such flexure might cause occurrence of a gap between the side wall of the first casing 3 and the side wall 4c of the second casing 4.

With occurrence of such a gap, an elongate hole is formed so as to extend from one screw 5 toward the other screw 5, so that electrical conduction between the first casing 3 and the second casing 4 can no longer be secured enough due to the elongate hole. Then, radiation noise becomes more likely to leak from between the side wall of the first casing 3 and the side wall 4c of the second casing 4, i.e., through the elongate hole.

Accordingly, the protrusion 3c is provided at a central portion of the rear-side side wall of the first casing 3, to which the optical pickup part 8a makes a closest approach, as shown in FIGS. 4 and 5, so that even upon the closest approach of the optical pickup part 8a, the electrical connection between the first casing 3 and the second casing 4 can be maintained. More specifically, the protrusion 3c is provided in the first casing 3 so that when the second casing 4 is fitted to the first casing 3, the protrusion 3c presses the side wall 4c of the second casing toward the outside.

According to the structure having such a protrusion 3c as shown above, even with the optical disc drive device provided in a downsized scale, electrical conduction between the portion of the side wall of the first casing 3 to which the optical pickup part 8a makes a closest approach and the opposing portion of the side wall 4c of the second casing can be secured enough. As a result, outward release of radiation noise from between the first casing 3 and the second casing 4 can be reduced.

Preferably, as shown in FIG. 3, the optical pickup unit 8 is placed so that the optical pickup part 8a is moved toward the side wall 4c opposed to the disc insertion opening 1a in the same direction as the optical-disc insertion direction. Alternatively, the optical pickup unit 8 may also preferably be placed so that the optical pickup part 8a is moved in a direction perpendicular to the optical-disc insertion direction. As a result, leakage of radiation noise to the outside through the disc insertion opening 1a can be suppressed.

Also, the protrusion 3c may be formed not so that the protrusion 3c protrudes from a side wall of the first casing 3 so as to come into contact with the side wall 4c of the second casing 4, but so that the protrusion 3c protrudes from the side wall 4c of the second casing 4 so as to come into contact with the side wall of the first casing 3.

Furthermore, instead of the protrusion 3c, a protrusion electrically connected to a back face of a top plate of the second casing 4 may be provided in an upper end face of the side wall of the first casing 3 to which the optical pickup part 8a makes a closest approach. That is, at a portion between the first casing 3 and the second casing 4 where there may arise a gap due to the closest approach of the optical pickup part 8a, a protrusion for maintaining electrical connection may be provided.

Figure 6:
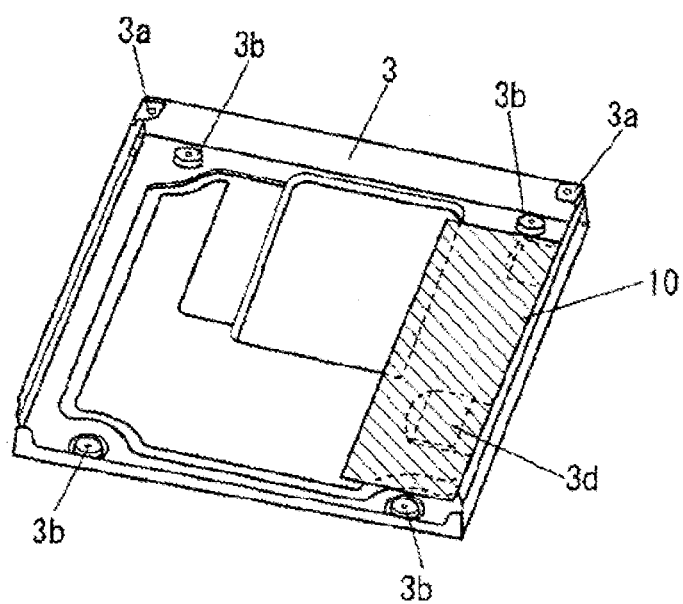
FIG. 6 is a perspective view showing a positional relationship between the first casing and a printed wiring substrate of a control circuit block.
Figure 7:
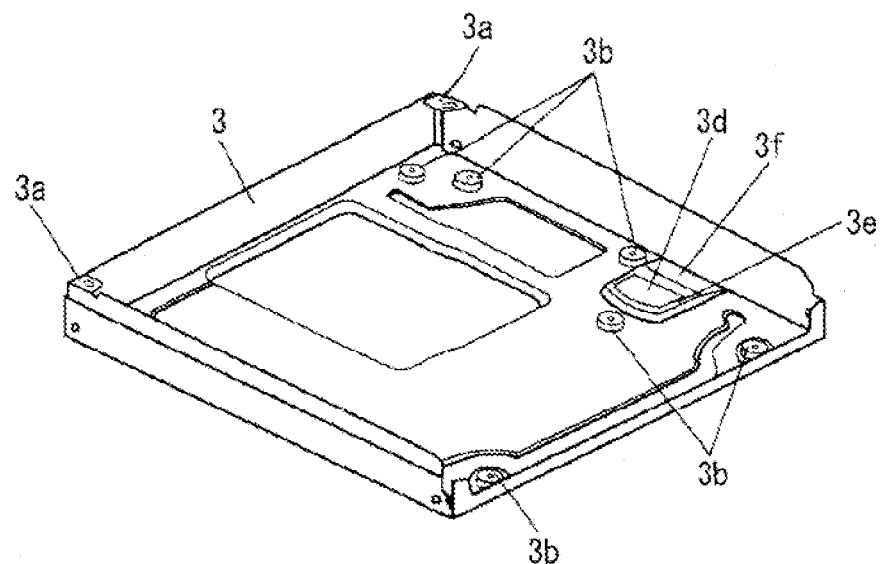
FIG. 7 is a perspective view showing a state in which the printed wiring substrate is excluded in FIG. 6.
Figure 8:
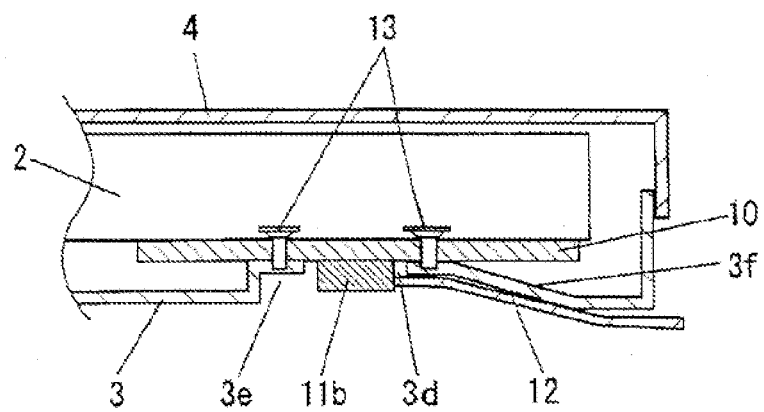
FIG. 8 is a schematic sectional view showing a structure of an interfacing connector portion in the control circuit block.

FIG. 6 is a perspective view showing a positional relationship between the first casing and the printed wiring substrate of the control circuit block. FIG. 7 is a perspective view showing a state in which the printed wiring substrate is excluded in FIG. 6. FIG. 8 is a schematic sectional view showing a structure of an interfacing connector portion in the control circuit block.

As shown in FIGS. 6, 7 and 8, at a portion of the bottom of the first casing 3 corresponding to the connector 11b mounted on the printed wiring substrate 10, an opening 3d for allowing the connector 11b to protrude outward of the first casing 3 is provided. A flat cable 12, which is a cable for external connection to fulfill transmission and reception of signals to and from external electronic equipment (not shown), is inserted into the connector 11b protruding from the opening 3d.

Also, the opening 3d of the first casing 3 is formed at a bottom portion of a recess portion 3e recessed from outside to inside of the first casing 3. The recess portion 3e is sized so as to accommodate the connector 11b protruding from the opening 3d so that the connector 11b is prevented from extending beyond the bottom face of the first casing 3.

Further, a surface 3f which is a portion of the recess portion 3e for accommodating the connector 11b therein and along which the flat cable 12 inserted into the connector 11b extends is formed as a sloped surface sloped from the bottom portion of the recess portion 3e toward an outer surface of the first casing 3. By laying down the flat cable 12 along the sloped surface 3f so that the flat cable 12 is inserted into the connector 11b protruding from the opening 3d, the flat cable 12 can easily be electrically connected to the connector 11b. For practical implementation of this, the connector 11b has an insertion opening into which the flat cable 12 is inserted so as to extend from the connector 11b in a direction crossing (intersecting) with, preferably orthogonal to, a direction of protrusion in which the connector 11b protrudes from the opening 3d.

According to such an interconnection structure around the connector 11b as shown above, the flat cable 12 can be provided so as to extend from the connector 11b while being kept along the first casing 3, which is an electric conductor. In this case, a loop area over which a common mode current flows in the flat cable 12 can be reduced. As a result, radiation noise generated from the flat cable 12 can be reduced, so that radiation noise generated from the optical disc drive device can be reduced.

Further, since the opening 3d that allows the connector 11b to be protruded is formed at a bottom portion of the recess portion 3e recessed inward of the first casing 3, the connector 11b can be placed so as not to extend beyond the bottom face of the first casing 3.

In this embodiment, the opening 3d of the first casing 3 is formed at a bottom portion of the recess portion 3e. However, the present disclosure is not limited to this. For example, the opening 3d that allows the connector 11b of the printed wiring substrate 10 to protrude outward may be formed in the first casing 3 without forming the recess portion 3e.

Further, the external connection cable connected to the connector 11b and laid down along the sloped surface 3f of the recess portion 3e of the first casing 3 is not limited to the flat cable 12.

As described above and as shown in FIG. 8, the printed wiring substrate 10 is screwed to the fitting portions 3b of the first casing 3 with screws 13. More specifically, the printed wiring substrate 10 is fixed to the first casing 3 in a state in which the ground pattern 10a formed around the connector 11b is in electrical contact with the fringe portion of the opening 3d of the first casing 3.

Figure 9:
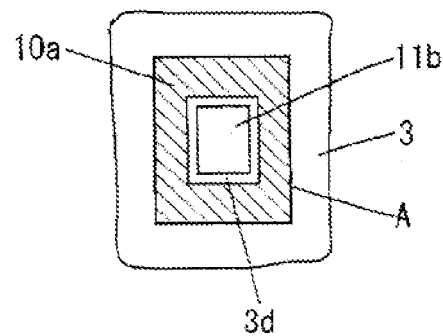
FIG. 9 is a schematic view showing a contact state between a fringe portion of an opening of the first casing and a ground pattern of the printed wiring substrate.

FIG. 9 is a schematic view showing a contact state between the fringe portion of the opening 3d of the first casing 3 and the ground pattern 10a of the printed wiring substrate 10. As shown in FIG. 9, the ground pattern 10a of the printed wiring substrate 10 is fixed to the fitting portions 3b of the first casing 3 with the screws 13, and is thereby maintained in a state of electrical contact with the bottom portion (a portion indicated by area A) of the recess portion 3e, which is a fringe portion of the opening 3d of the first casing 3.

According to such an interconnection structure around the connector 11b as shown above, the ground pattern 10a of the printed wiring substrate 10 is securely electrically connected to the exterior casing 1. Also, the ground pattern 10a of the printed wiring substrate 10 is formed so as to surround the periphery of the connector 11b, coming into electrical contact with the first casing 3. Therefore, release of radiation noise to the outside between the connector 11b and the opening 3d can be reduced. That is, the connector 11b protrudes from the opening 3d in a state in which shielding is provided between the connector 11b and the opening 3d. In addition to this, intrusion of foreign matters into the exterior casing 1 between the connector 11b and the opening 3d can be suppressed.

As described hereinabove, according to this embodiment, in the optical disc drive device, radiation noise to the outside can be reduced. Further, by virtue of the structure in which radiation noise is structurally reduced, there can be provided an optical disc drive device showing less variations in the radiation noise reduction effect.

It is noted that the present invention is not limited to optical disc driving devices. The present invention relates to, in a broad sense, wiring (interconnecting) structures having a metallic exterior casing and an internal unit to be housed in the exterior casing, the internal unit further including a printed wiring substrate on which a connector for fulfilling transmission and reception of electrical signals from and to external electronic equipment via an external-connection cable is mounted.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present disclosure as defined by the appended claims unless they depart therefrom.

What is claimed is:

1. An optical disc driving device comprising:
   a metallic exterior casing having an opening;
   an internal unit housed within said exterior casing, said internal unit including an optical pickup unit for performing recording or reproduction of information signals on an optical disc, and a printed wiring substrate electrically connected to said optical pickup unit and having a connector protruding outside said exterior casing through said opening in said exterior casing; and
   an external-connection cable for transmitting electrical signals between said connector of said printed wiring substrate and external electronic equipment;
   wherein said external-connection cable is connected to said connector such that a direction of extension of said external-connection cable from said connector intersects a direction of protrusion of said connector through said opening in said exterior casing; and
   wherein said external-connection cable is configured to extend from said connector along a surface of said exterior casing.

2. The optical disc driving device according to claim 1, wherein:
   said exterior casing has a recess portion including a sloped surface sloped inwardly toward an inside of said exterior casing;
   said opening is formed at a bottom portion of said recess portion; and
   said external-connection cable is configured to extend from said connector along said sloped surface.

3. The optical disc driving device according to claim 2, wherein:
   said printed wiring substrate has a ground pattern formed surrounding said connector; and
   said ground pattern electrically contacts a fringe portion of said opening of said exterior casing.

4. The optical disc driving device according to claim 1, wherein:
   said printed wiring substrate has a ground pattern formed to surround said connector; and
   said ground pattern electrically contacts a fringe portion of said opening of said exterior casing.

5. A wiring structure comprising:
   a metallic exterior casing;
   an internal unit to be housed within said exterior casing, said internal unit including a printed wiring substrate;
   an external-connection cable; and
   a connector mounted on said printed wiring substrate for fulfilling transmission and reception of electrical signals from and to external electronic equipment via said external-connection cable;
   wherein said exterior casing has an opening for allowing said connector to project outside;
   wherein said external-connection cable is connected to said connector such that a direction of extension of said external-connection cable from said connector intersects a direction of protrusion of said connector through said opening in said exterior casing; and
   wherein said external-connection cable is configured to extend from said connector along a surface of said exterior casing.

* * * * *